(12) United States Patent
You et al.

(10) Patent No.: US 8,751,030 B2
(45) Date of Patent: Jun. 10, 2014

(54) AUDIO PLAYER AND OPERATING METHOD AUTOMATICALLY SELECTING MUSIC TYPE MODE ACCORDING TO ENVIRONMENT NOISE

(75) Inventors: Qiang You, Shenzhen (CN); Shih-Fang Wong, New Taipei (TW); Tsung-Jen Chuang, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 182 days.

(21) Appl. No.: 13/278,190

(22) Filed: Oct. 21, 2011

(65) Prior Publication Data
US 2013/0030557 A1 Jan. 31, 2013

(30) Foreign Application Priority Data
Jul. 25, 2011 (CN) .......................... 2011 1 0208788

(51) Int. Cl.
*G06F 17/00* (2006.01)
(52) U.S. Cl.
USPC ................... 700/94; 84/603; 84/609

(58) Field of Classification Search
USPC .......................................... 700/94
See application file for complete search history.

(56) References Cited

U.S. PATENT DOCUMENTS

2004/0003706 A1* 1/2004 Tagawa et al. ................. 84/609
2007/0119288 A1* 5/2007 Makino ........................ 84/602

* cited by examiner

*Primary Examiner* — Curtis Kuntz
*Assistant Examiner* — Thomas Maung
(74) *Attorney, Agent, or Firm* — Novak Druce Connolly Bove + Quigg LLP

(57) ABSTRACT

An audio player includes a storage unit storing music type modes and audio files; an input device provided for selecting an automatic switching mode of the audio player; a detection circuit sampling noise of the current environment and generating a detection signal according to the noise of the current environment; a processor performing the automatic switching mode by selecting one of the music type modes according to the detection signal and finding one or more of the audio files having identities corresponding to the selected music type mode; and an output device outputting data of the audio files having identities corresponding to the selected music type mode.

1 Claim, 3 Drawing Sheets

AUDIO PLAYER AND OPERATING METHOD AUTOMATICALLY SELECTING MUSIC TYPE MODE ACCORDING TO ENVIRONMENT NOISE

BACKGROUND

1. Technical Field

The present disclosure generally relates to an audio player that is able to automatically select a music type mode according to ambient environment noise, and to an associated operating method for the audio player.

2. Description of Related Art

Audio players are widely used in daily life and work. A typical audio player normally plays music according to a music list stored therein by a user. The audio player sequentially plays songs in the music list according to the order of storage of the songs, or replays one or more songs selected by the user. However, when the local environment changes, such as from a quiet environment to a noisy environment, the user typically needs to manually reselect some quick-tempo songs (or, e.g., rock music) that are more suitable for listening to in the noisy environment. It is somewhat inconvenient for the user to have to change the music genre according to the change of environment.

What is needed, therefore, is an audio player which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will now be made to the drawings to describe preferred and exemplary embodiments in detail.

Figure 1:
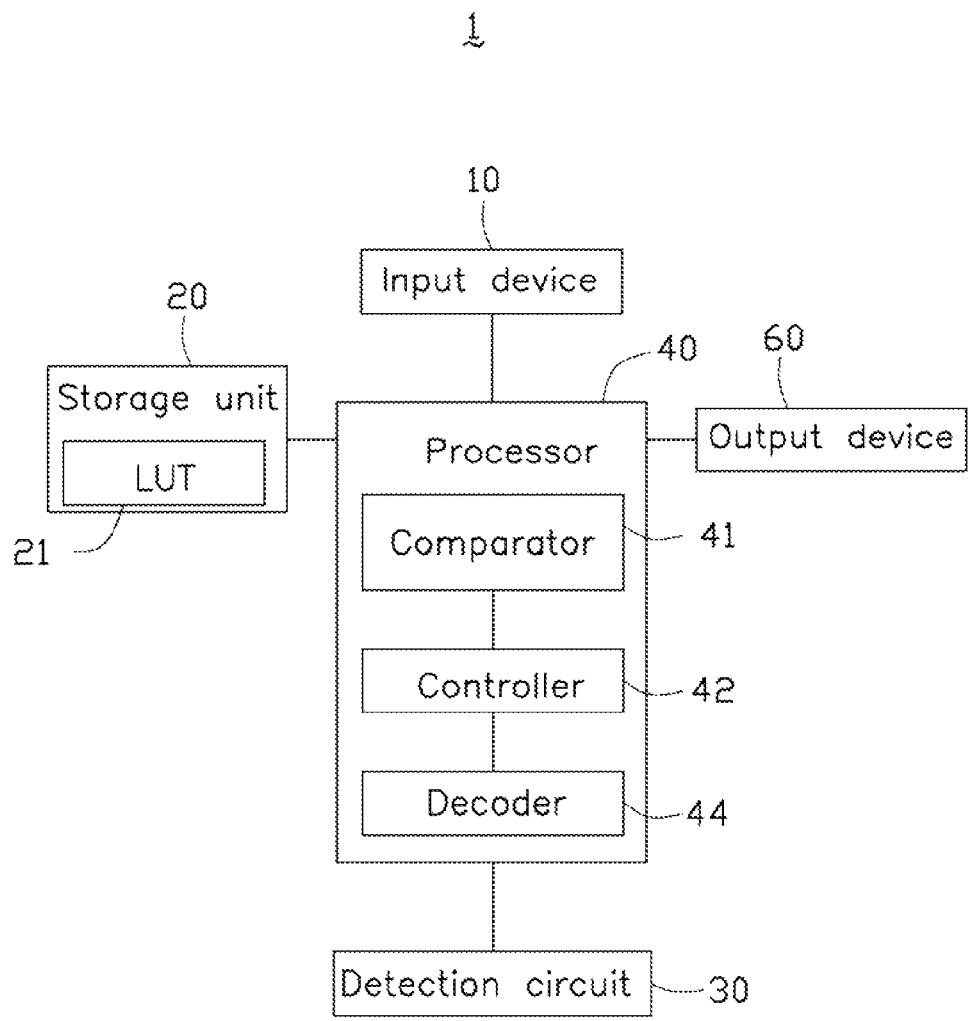
FIG. 1 is a block diagram of an audio player according to one embodiment, the audio player including a detection circuit for sampling and transforming environment noise into a detection signal.

Referring to FIG. 1, a schematic block diagram of an audio player 1 according to one embodiment is shown. The audio player 1 may be an optical disk player, an MP3 (Moving Picture Experts Group Audio Layer 3) player, an MP4 (Moving Picture Experts Group Audio Layer 4) player, a mobile phone, or any other electrical device with music playing function. The audio player 1 includes an input device 10, a storage unit 20, a detection circuit 30, a processor 40, and an output device 60. The processor 40 is respectively electrically coupled to the input device 10, the storage unit 20, the detection circuit 30, and the output device 60.

The input device 10 provides an interface for a user to select a playback mode, and also generates a corresponding trigger signal that is sent to the processor 40. The playback mode is selected from an automatic switching mode and other traditional playback modes. The traditional playback modes include a circulation playback mode, a sequence playback mode, and a repeat playback mode, for example. The input device 10 also receives audio files transferred from an external device, such as a computer or server. Each audio file includes basic information of a song, and audio encoded data of the song. The basic information of the song includes information relating to the identity of the song, and can for example include the title, the artist, the year when the song was produced, playing duration, file format, bit rate, sample rate, and genre.

In this embodiment, the input device 10 is further provided for the user to arrange the audio files. The user can build a plurality of music type modes respectively corresponding to different environments in which the audio player 1 might be used. In a typical embodiment, the music type modes are stored in the storage unit 20. For example, a first music type mode corresponds to a very quiet environment, a second music type mode corresponds to a moderately quiet environment, a third music type mode corresponds to a moderately noisy environment, and a fourth music type mode corresponds to a very noisy environment. In an alternative embodiment, the music type modes may be preset in the audio player 1 in the process of manufacturing the audio player 1. Then the user can distribute (i.e. allocate) audio files to the music type modes according to the genres of the audio files, or alternatively the audio player 1 automatically distributes audio files stored therein according to the genres of the audio files. In an alternative embodiment, the audio files can be distributed to the music type modes according to rhythm, tempo or other characteristics of the audio files. In this embodiment, for example, audio files of ballad and new age genres may be distributed to the first music type mode, audio files of classical pop and cappella genres may be distributed to the second music type mode, audio files of folk and epic house genres may be distributed to the third music type mode, and audio files of rhythm and blues (R & B) and hard house genres may be distributed to the fourth music type mode. Alternatively, the user can distribute audio files to the music type modes according to his/her preferences.

Figure 2:
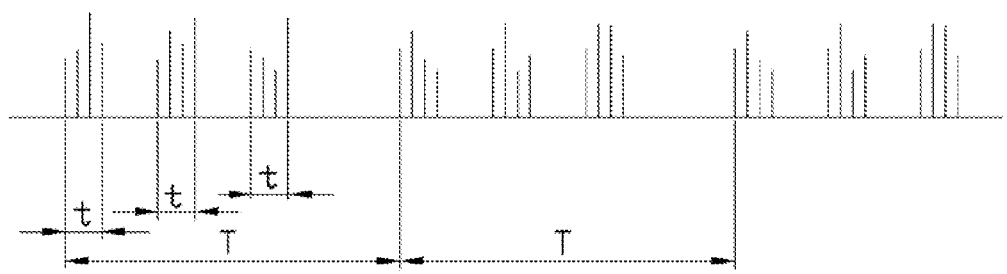
FIG. 2 is a waveform diagram of the detection signal output from the detection circuit in FIG. 1.

The detection circuit 30 samples noise of the local environment, and accordingly generates a detection signal representing information of the environment noise. The detection circuit 30 may be a device for transforming a sound signal into an electronic signal, such as an acoustoelectric sensor with a microphone. Referring also to FIG. 2, a sampling frequency, a sampling time "t", and a sampling period "T" can be set according to a detection precision of the detection circuit 30. The higher the detection precision is, the higher the sampling frequency can be set in a sampling period "T", and/or the shorter the sampling time "t" can be set in the same sampling period "T".

The storage unit 20 may be a memory or a hard disk, for example. The storage unit 20 stores data of the audio files, a look up table (LUT) 21, and reference values. In this embodiment, the LUT 21 records relationships between look-up control signals output from the processor 40 and the music type modes, and relationships between the music type modes and identities (i.e., genres) of the audio files. The reference values are benchmarks set in advance, and are compared with the detection signal generated by the detection circuit 30. The reference values may cooperatively represent a reference waveform, for example.

The processor 40 includes a comparator 41, a controller 42, and a decoder 44. The comparator 41 receives the detection signal, and analyzes some characteristic values of the detection signal (such as magnitude and variation rate) which cooperatively represent a waveform of the detection signal. The magnitude of the detection signal may be the sum of, or the average of, sampling values in a current sampling period T. The variation rate of the detection signal may represent variation of the sampling values in the current sampling period T, or variation of the sampling values in a previous sampling period T and the current sampling period T, or variation of the sampling values in several previous sampling periods T and the current sampling period T.

In addition, the comparator 41 compares the waveform of the detection signal with the reference waveform to obtain a comparison result. In particular, the comparator 41 obtains a first detection value corresponding to the magnitude of the detection signal and a second detection value corresponding to the variation rate of the detection signal. Then the comparator 41 compares the first detection value with a first reference value stored in the storage unit 20, and compares the second detection value with a second reference value stored in the storage unit 20, to obtain a comparison result. In the event that the first and second detection values are similar to or equal to the first and second reference values, this means the noise of the environment does not substantially change. In the event that the first and second detection values are different from the first and second reference values, this means the noise of the environment changes, and the comparator 41 generates a look-up control signal according to the comparison result. In particular, for example, in the event that the first detection value is less than the first reference value and the second detection value is less than the second reference value, the comparator 41 outputs a first look-up control signal to the controller 42 for selecting the first music type mode. In the event that the first detection value is more than the first reference value and the second detection value is less than the second reference value, the comparator 41 outputs a second look-up control signal to the controller 42 for selecting the second music type mode. In the event that the first detection value is less than the first reference value and the second detection value is more than the second reference value, the comparator 41 outputs a third look-up control signal to the controller 42 for selecting the third music type mode. In the event that the first detection value is more than the first reference value and the second detection value is more than the second reference value, the comparator 41 outputs a fourth look-up control signal to the controller 42 for selecting the fourth music type mode.

In an alternative embodiment, the detection signal can be extracted into more than two detection values cooperatively representing the waveform of the noise of the environment, and more than two reference values corresponding to the detection values can be set to be compared with the detection values.

The controller 42 receives the look-up control signal output from the comparator 41 and selects a music type mode from the LUT 21. In addition, the controller 42 searches and determines whether the audio files stored in the storage unit 20 include any audio files having identities corresponding to the selected music type mode. If the audio files stored in the storage unit 20 include one or more audio files having identities corresponding to the selected music type mode, then the controller 42 outputs the data of the corresponding audio files to the decoder 44.

In an alternative embodiment, the controller 42 can first determine whether the selected music type mode has any audio files distributed therein by a user. If the selected music type mode has one or more audio files distributed therein by a user, the controller 42 outputs the data of the corresponding audio files to the decoder 44. If the selected music type mode does not have any audio file distributed therein by a user, then the controller 42 searches and determines whether the audio files stored in the storage unit 20 include any audio files having identities corresponding to the selected music type mode. If the audio files stored in the storage unit 20 include one or more audio files having identities corresponding to the selected music type mode, then the controller 42 outputs the data of the corresponding audio files to the decoder 44.

The decoder 44 receives and decodes the data of the audio files corresponding to the selected music type mode, and generates a decode signal. The output device 60 outputs an audio signal according to the decode signal.

In an operation of the audio player 1, when a user wants to use the automatic switching mode of the audio player 1, he/she needs to select the automatic switching mode via the input device 10. The input device 10 outputs the trigger signal to the processor 40, and the processor 40 outputs a control signal to the detection circuit 30. The detection circuit 30 samples noise of the current environment where the audio player 1 is located according to the control signal, and generates a detection signal representing information of the current environment noise. The comparator 41 receives the detection signal, and compares a waveform of the detection signal with a reference waveform stored in the storage unit 20 to obtain a comparison result. In addition, the comparator 41 generates a look-up control signal according to the comparison result. The controller 42 receives the look-up control signal, and selects a corresponding music type mode from the LUT 21 according to the look-up control signal. The controller 42 further searches the audio files stored in the storage unit 20, and outputs the data of the audio files having identities corresponding to the selected music type mode to the decoder 44.

In an alternative embodiment, the user can distribute audio files to the music type modes beforehand. If the selected music type mode has one or more audio files distributed therein, the controller 42 outputs the data of the audio files from the storage unit 20 to the decoder 44. If the selected music type mode does not have any audio file distributed therein, then the controller 42 searches the audio files stored in the storage unit 20, and outputs the data of the audio files having identities corresponding to the selected music type mode to the decoder 44.

The decoder 44 receives and decodes the data of the audio files corresponding to the selected music type mode, and generates a decode signal. The output device 60 outputs an audio signal according to the decode signal. Therefore whenever the noise of the environment changes, the audio player 1 can automatically select a music type mode most suitable for listening according to the current environment, and play music of that mode. Thus, the user can more conveniently enjoy music of the best music type mode in any given one of different noise environments.

Figure 3:
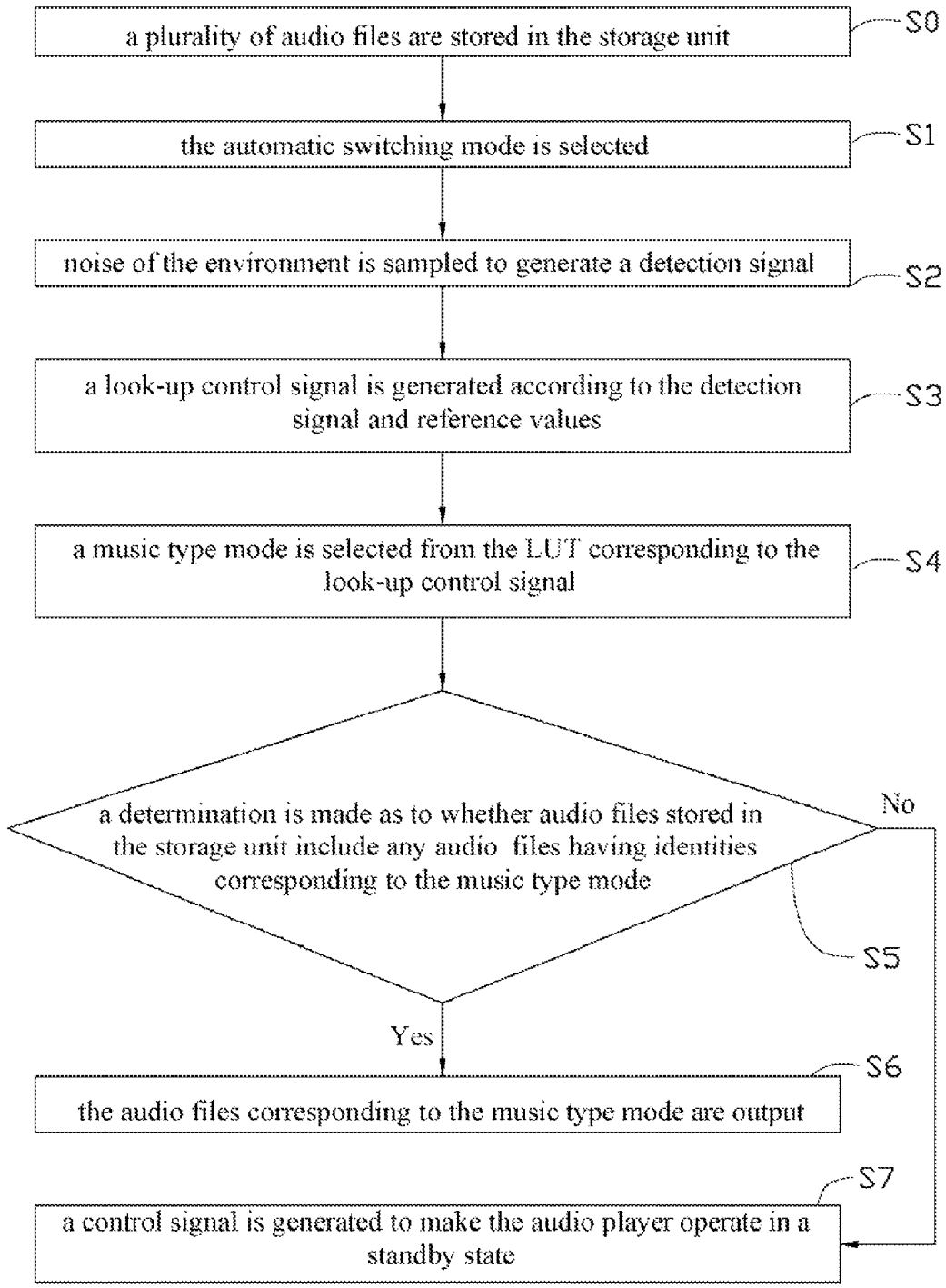
FIG. 3 is a flowchart of an operating method of the audio player in FIG. 1.

Referring to FIG. 3, a flow chart of an operating method for the audio player 1 is shown. The operating method includes the following steps.

In step S0, a plurality of audio files are stored in the storage unit 20. When the user operates the audio player 1, he/she downloads the audio files from a computer or network (e.g., a server) via the input device 10, and stores the audio files in the storage unit 20. In an alternative embodiment, the storage unit 20 can have some audio files pre-stored therein before the audio player 1 is sold on the market.

In step S1, the automatic switching mode is selected. When the user selects the automatic switching mode via the input device 10, the input device 10 generates and outputs a trigger signal to the processor 40 to run the automatic switching mode.

In step S2, noise of the environment is sampled to generate a detection signal. When the processor 40 receives the trigger signal output from the input device 10, the processor 40 controls the detection circuit 30 to sample the noise of the current environment. Then the detection circuit 30 generates the detection signal representing information of the environment noise, and outputs the detection signal to the processor 40.

In step S3, a look-up control signal is generated according to the detection signal and reference values. The comparator 41 receives the detection signal and analyzes the detection signal to obtain detection values cooperatively representing a waveform of the detection signal. The comparator 41 further compares the detection values with corresponding reference values stored in the storage unit 20, and generates the look-up control signal according to the comparison result. Then the look-up control signal is output to the controller 42.

In step S4, a music type mode is selected from the LUT 21 corresponding to the look-up control signal. The controller 42 receives the look-up control signal, and selects the music type mode corresponding to the look-up control signal in the LUT 21.

In step S5, a determination is made as to whether audio files stored in the storage unit 20 include any audio files having identities corresponding to the selected music type mode. After the music type mode is selected, the controller 42 searches the storage unit 20 to determine whether a first one of the audio files has an identity corresponding to the selected music type mode. If the first audio file corresponds to the selected music type mode, the controller 42 outputs the data of the first audio file from the storage unit 20 to the decoder 44. If the first audio file does not correspond to the selected music type mode, the controller 42 continues to search the storage unit 20 to determine whether a next one of the audio files stored in the storage unit has an identity corresponding to the selected music type mode. The controller 42 continues to search the audio files in sequence until an audio file having an identity corresponding to the selected music type mode is found, or until all the audio files stored in the storage unit 20 have been searched. If there is no audio file stored in the storage unit 20 which corresponds to the selected music type mode, the controller 42 generates a control signal to make the audio player 1 operate in a standby state (see step S7).

In an alternative embodiment, the controller 42 can first determine whether the selected music type mode has one or more audio files distributed therein by the user. If the selected music type mode has one or more audio files distributed therein, the controller 42 outputs the data of the audio files from the storage unit 20 to the decoder 44. If the selected music type mode does not have any audio files distributed therein, then the controller 42 searches and determines whether the audio files stored in the storage unit 20 include any audio files having identities corresponding to the selected music type mode; and if audio files having identities corresponding to the selected music type mode are found, the controller 42 outputs the data of the audio files to the decoder 44.

In step S6, the audio files corresponding to the music type mode are output. The decoder 44 receives and decodes the data of the audio files corresponding to the selected music type mode, generates a decode signal, and sends the decode signal to the output device 60. Then the output device 60 outputs an audio signal according to the decode signal.

It is believed that the present embodiments and their advantages will be understood from the foregoing description, and it will be apparent that various changes may be made thereto without departing from the spirit and scope of the embodiments or sacrificing all of their material advantages.

What is claimed is:

1. An operating method of an audio player, the audio player comprising a storage unit that stores a plurality of audio files, an input device, a detection circuit, a processor and an output device, the method comprising:

building a plurality of music type modes to respectively correspond to different environments and distributing one or more of the audio files to each of the music type modes via the input device;

switching to an automatic switching mode of the audio player via the input device;

sampling noise of a local environment of the audio player and generating a detection signal by the detection circuit according to the sampled noise, the detection signal representing environmental noise of one of the different environments, the detection signal comprising a magnitude and a variation rate, which cooperatively represent a waveform of the detection signal;

storing a first reference value and a second reference value in the storage unit, the first and second reference values cooperatively representing a reference waveform;

selecting one of the music type modes according to the detection signal using the processor to analyze the detection signal to obtain a first and a second detection values respectively corresponding to the magnitude and the variation rate, and comparing the first and second detection values with the first and second reference values, respectively; in the event that the first detection value is less than the first reference value and the second detection value is less than the second reference value, a first music type mode corresponding to a very quiet environment is selected; in the event that the first detection value is greater than the first reference value and the second detection value is less than the second reference value, a second music type mode corresponding to a moderately quiet environment is selected; in the event that the first detection value is less than the first reference value and the second detection value is greater than the second reference value, a third music type mode corresponding to a moderately noisy environment is selected; and in the event that the first detection value is greater than the first reference value and the second detection value is greater than the second reference value, a fourth music type mode corresponding to a very noisy environment is selected;

determining whether the audio files comprise one or more audio files having identities corresponding to the selected music type mode, and finding from the storage unit one or more of the audio files distributed to the selected music type mode by the processor if the audio files comprise one or more audio files having identities corresponding to the selected music type mode; and outputting data of the audio files which are distributed to the selected music type mode by the output device.

* * * * *